(12) United States Patent
Lee et al.

(10) Patent No.: US 9,078,151 B2
(45) Date of Patent: Jul. 7, 2015

(54) LINK PERFORMANCE ABSTRACTION METHOD AND APPARATUS IN A WIRELESS COMMUNICATION SYSTEM

(71) Applicant: Samsung Electronics Co., Ltd., Suwon-si, Gyeonggi-do (KR)

(72) Inventors: Heun-Chul Lee, Pocheon-si (KR); Tae-Yoon Kim, Seongnam-si (KR); Won-Woo Park, Suwon-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/263,285

(22) Filed: Apr. 28, 2014

(65) Prior Publication Data

US 2014/0321521 A1    Oct. 30, 2014

Related U.S. Application Data

(60) Provisional application No. 61/816,395, filed on Apr. 26, 2013.

(30) Foreign Application Priority Data

Sep. 9, 2013    (KR) .................... 10-2013-0107902

(51) Int. Cl.
*H04B 3/46*    (2006.01)
*H04B 17/00*    (2006.01)
*H04W 24/02*    (2009.01)
*H04L 27/26*    (2006.01)
*H04Q 1/20*    (2006.01)

(52) U.S. Cl.
CPC .......... *H04W 24/02* (2013.01); *H04L 27/2647* (2013.01)

(58) Field of Classification Search
CPC ..... H04W 24/02; H04L 27/2647; H04L 1/20; H04L 17/006; H04L 5/0007; H04L 27/2657; H04L 27/2332; H04L 2027/003; H04L 25/03057; H04L 25/067; H04B 1/30; H04B 3/32
USPC .......... 375/227, 285, 216, 324, 340, 348, 260
See application file for complete search history.

(56) References Cited

U.S. PATENT DOCUMENTS

| 8,391,128 | B2* | 3/2013 | Higuchi et al. | ............... 370/203 |
| 2008/0240216 | A1* | 10/2008 | Kolding et al. | ............... 375/227 |
| 2010/0064185 | A1* | 3/2010 | Zheng et al. | .................. 714/704 |
| 2012/0170525 | A1* | 7/2012 | Sorrentino | .................... 370/329 |

* cited by examiner

*Primary Examiner* — Ted Wang
(74) *Attorney, Agent, or Firm* — Jefferson IP Law, LLP

(57) ABSTRACT

A method and an apparatus for link performance abstraction for a receiver employing Interference-Aware Communications (IAC) technology in a wireless communication system are provided. A method for operating a receiving apparatus for the link performance abstraction in the wireless communication system, includes receiving an Orthogonal Frequency Division Multiplexing (OFDM) over a plurality of spatial layers, splitting and post-processing the received signal based on the spatial layers, deriving a post-processing Signal-to-Interference-plus-Noise Ratio (SINR) of each spatial layer, converting the post-processing SINR of the spatial layers to a Mutual Information per coded Bit (MIB) adaptively tuned based on an instantaneous Interference-to-Signal Ratio (ISR), and estimating a Block Error Rate (BLER) from a mean of the MIB metrics of the spatial layers.

23 Claims, 13 Drawing Sheets

LINK PERFORMANCE ABSTRACTION METHOD AND APPARATUS IN A WIRELESS COMMUNICATION SYSTEM

CROSS-REFERENCE TO RELATED APPLICATION(S)

This application claims the benefit under 35 U.S.C. §119 (e) of a U.S. Provisional application filed on Apr. 26, 2013 in the U.S. Patent and Trademark Office and assigned Ser. No. 61/816,395 and under 35 U.S.C. §119(a) of a Korean patent application filed on Sep. 9, 2013 in the Korean Intellectual Property Office and assigned Serial number 10-2013-0107902, the entire disclosure of each of which is hereby incorporated by reference.

TECHNICAL FIELD

The present disclosure relates to link performance abstraction of a wireless communication system.

BACKGROUND

A User Equipment (UE) of a wireless communication system abstracts link performance from a Base Station (BS) and feeds the abstracted link performance information (e.g., Channel Quality Indicator (CQI)) back to the BS. With the fed link performance information, the BS performs a link adaptation process.

According to the related art, the UE generates the link performance information by taking into account only a Signal-to-Interference-plus-Noise Ratio (SINR). However, recently, a receiver employing Interference-Aware Communications (IAC) technology is under discussion.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for link performance abstraction for a receiver employing Interference-Aware Communications (IAC) technology in a wireless communication system.

Another aspect of the present disclosure is to provide a method and an apparatus for link performance abstraction by taking into account inter-cell interference in a User Equipment (UE) of a wireless communication system.

In accordance with an aspect of the present disclosure, a method for operating a receiving apparatus for link performance abstraction in a wireless communication system is provided. The method includes receiving an Orthogonal Frequency Division Multiplexing (OFDM) over a plurality of spatial layers, splitting and post-processing the received signal based on the spatial layers, deriving a post-processing Signal-to-Interference-plus-Noise Ratio (SINR) of each spatial layer, converting the post-processing SINR of the spatial layers to a Mutual Information per coded Bit (MIB) adaptively tuned based on an instantaneous Interference-to-Signal Ratio (ISR), and estimating a Block Error Rate (BLER) from a mean of the MIB metrics of the spatial layers.

In accordance with another aspect of the present disclosure, a receiving apparatus for link performance abstraction in a wireless communication system is provided. The receiving apparatus includes a receiver configured to receive an OFDM over a plurality of spatial layers, a SINR extractor configured to split and post-process the received signal based on the spatial layers, and to derive a post-processing SINR of each spatial layer, an MIB calculator configured to convert the post-processing SINR of the spatial layers to a MIB adaptively tuned based on an instantaneous ISR, and a BLER estimator configured to estimate a BLER from a mean of the MIB metrics of the spatial layers.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
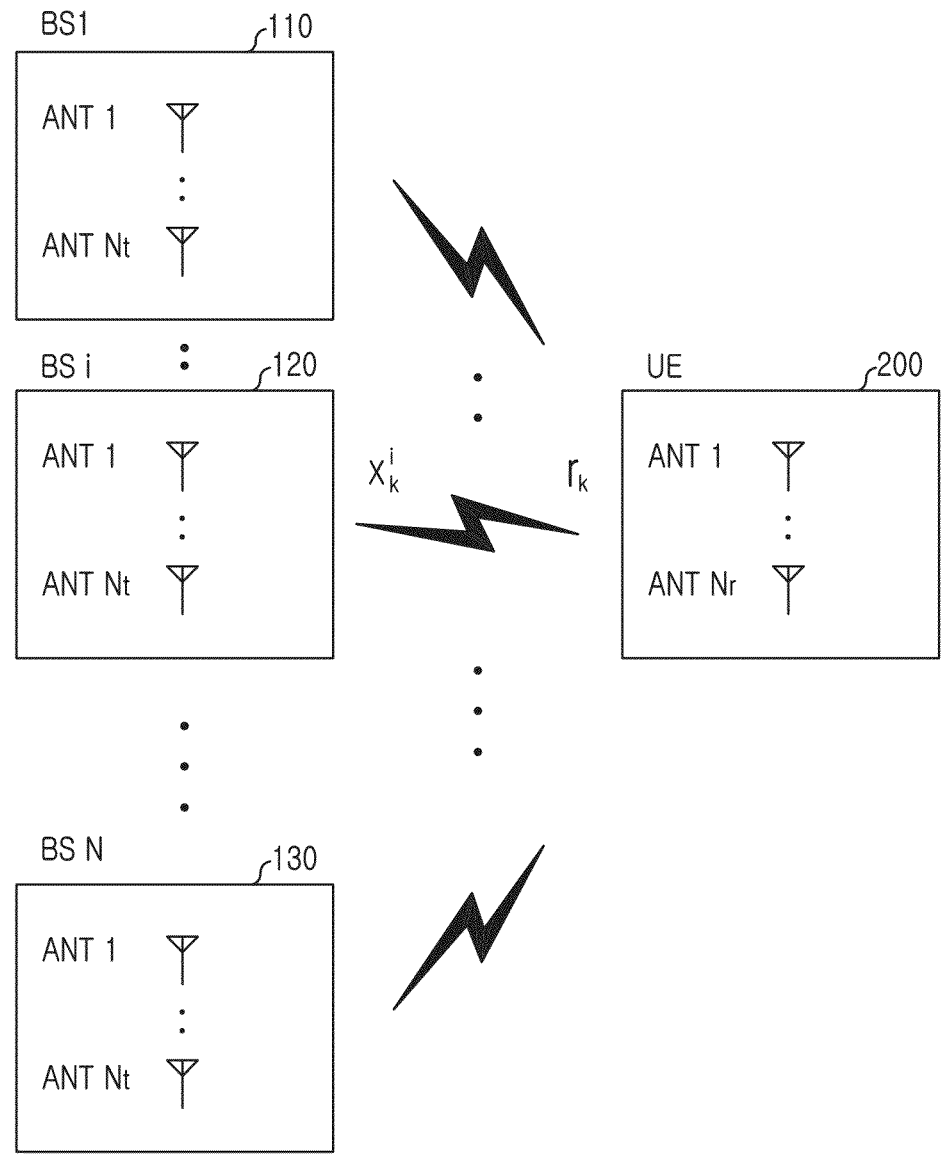
FIG. 1 illustrates a system model of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a User Equipment (UE) may be an electronic device.

In order to improve coverage and spectral efficiency, a wireless communication system such as Long Term Evolution Advanced (LTE-A) system and/or the like may be (e.g., expected to be) deployed with an aggressive frequency reuse factor and a high density of Base Station (BS) sites. Particularly, the BSs in an LTE-A network and/or the like may achieve multiple accesses via Multiple-Input Multiple-Output (MIMO) technology and allow UEs to share frequency and time domain resources. The sharing of frequency and time domain resources by UEs inevitably leads to a severe inter-cell interference problem. In this context, advanced technologies such as enhanced Coordinated Multipoint (COMP) transmission and Intercell Interference Coordination (ICIC) are specified in recent LTE releases to improve cell-edge throughput for interference-limited scenarios.

More recently, advanced co-channel interference aware signal detection is drawing research attentions during recent development of the LTE-A system. Interference-Aware communications (IAC) is currently studied for including in LTE Release 12.

An advanced IAC receiver may provide significant performance benefits with network assistance. To realize actual performance improvement in the LTE-A system, incorporating a performance gain from the employed IAC receiver into adaptive transmission techniques such as link adaptation may be required. The link performance information such as Channel Quality Indicator (CQI) plays a key role in the link adaptation. The link adaptation is performed by the BS using CQI reports from the UE. Accordingly, more accurate CQI measurement at the UE may result in more throughput gain.

According to various embodiments of the present disclosure, in order to provide more accurate CQI measurement at the UE, the UE may require a link abstraction method to estimate the Block Error Rate (BLER) of each Modulation and Coding Scheme (MCS) for given current channel conditions, and may select as a CQI value the highest MCS which achieves a target BLER. In addition, according to various embodiments of the present disclosure, the link abstraction methodology provides a Physical-Layer (PHY) abstraction as a link-to-system interface mapping in System-Level Simulations (SLSs). Evaluation on the system-level performance of different air-interface technologies may require instantaneous BLER for a given channel realization, rather than long-term BLER in a fading channel. In summary, link abstraction methods should be able to accurately predict the time-varying BLER of a given link without extensive simulation.

Key technologies of the LTE system include Orthogonal Frequency Division Multiplexing (OFDM) and MIMO. The OFDM modulation technique divides the total available bandwidth into a number of equally spaced subcarriers, resulting in different fading gains for different subcarriers. Furthermore, Bit-Interleaved Coded Modulation (BICM) is considered for increasing code diversity to free a Hamming distance of the channel code on fading channels. Various embodiments of the present disclosure provide link performance abstraction of the IAC using Maximum-Likelihood Detection (MLD) for MIMO-OFDM systems in multicell multiuser interfering networks.

FIG. 1 illustrates a system model of a wireless communication system according to an embodiment of the present disclosure.

Referring to FIG. 1, a system may include a UE 200, a BS1 110, a BS i 120, and BS N 130. Each of BS 1 110, BS i 120, and BS N 130 may be equipped with $N_t$ transmit antennas. The UE 200 may be equipped with $N_r$, receive antennas.

Each of BS 1 110, BS i 120, and BS N 130 may respectively transmit messages to the UE 200.

Figure 2:
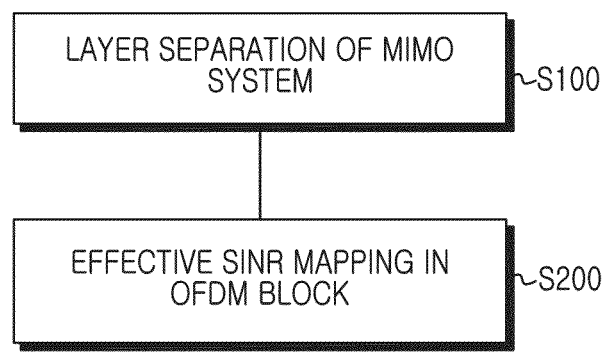
FIG. 2 illustrates link performance abstraction according to an embodiment of the present disclosure.

FIG. 2 illustrates link performance abstraction according to an embodiment of the present disclosure.

Referring to FIG. 2, a Signal-to-Interference-plus-Noise Ratio (SINR) may generally be used as a representative output to obtain an instantaneous BLER.

Taking into account the fact that the coded bits transmitted by MIMO-OFDM systems are spread over different subcarriers and spatial layers, the link abstraction method of the MIMO-OFDM system can include two stages, namely, layer separation in the MIMO system at operation S100 and Effective SINR Mapping (ESM) in the OFDM block at operation S200 as shown in FIG. 2.

Various embodiments of the present disclosure derive a post-processing SINR for each spatial layer of the MIMO system with MLD at each OFDM subcarrier, and then utilizes Mutual Information per coded Bit (MIB) metrics to convert a set of different post-processing SINRs obtained over the frequency-selective coded OFDM system, into a single MIB. The MIB value may be used to predict an instantaneous BLER of the MIMO-OFDM system. Meanwhile, various embodiments of the present disclosure use the BLER curves generated for the MCSs under Additive White Gaussian Noise (AWGN) assumption as reference curves.

The post-processing SINR of each spatial layer may be dependent on a detection algorithm used in the MIMO system. In the MIMO system including linear receivers such as Minimum Mean-Squared Error (MMSE) and Zero-Forcing (ZF) receivers, the post-processing SINR is readily given by the output SINR. However, in case of the Maximum-Likelihood (ML) receiver, calculating the post-processing SINR may be difficult (e.g., calculation of the post-processing SINR may not be straightforward) because the MLD-based demodulation is a nonlinear process.

In the paper of S.-H. Moon, K.-J. Lee, J. Kim, and I. Lee "Link Performance Estimation Techniques for MIMO-OFDM Systems with Maximum Likelihood Receiver," Wireless Communications, IEEE Transactions on, vol. 11, pp. 1808-1816, May 2012, the authors proposed a new approach for estimating the post-MLD SINR by combining the two performance bounds of a linear MMSE receiver and a genie-aided ML receiver. Unfortunately, the previous approach assumes the combining ratio between the two bounds to remain constant for the involved MCS. A conventional static approach works well under the condition of weak interference. However, such a conventional static approach fails to generate a well-behaved solution in the case of strong interference. Inspired by this observation, various embodiments of the present disclosure provide an adaptive approach according to which the combining parameter of the two bounds is adaptively computed based on the instantaneous Interference-to-Signal Ratio (ISR). According to various embodiments of the present disclosure, a basic idea is to exploit a probabilistic behavior of the optimal combining ratio over the ISR. The Link-Level Simulation (LLS) results are provided to verify prediction accuracy of the present link abstraction method. Moreover, various embodiments of the present disclosure use a proposed link abstraction model as a link-to-system interface mapping in system-level simulations so as to demonstrate the performance of the IAC receiver in the interference-limited LTE system.

Hereafter, descriptions are organized as follows. Section 1 presents an overview of the IAC concept and introduces equations for evaluation of the MIB (e.g., an exact evaluation of MIB). Section 2 presents a brief review of the conventional static approach to the layer separation. Section 2 further presents that various embodiments of the present disclosure may verify that the lower bound based on the linear MMSE receiver results in misleading lower bound in the conventional static approach under strong interference conditions. Section 3 presents that various embodiments of the present disclosure provide an ISR-adaptive approach to overcome drawbacks of the lower bound. Section 4 presents simulation results comparing various embodiments of the present disclosure with the approach according to the related art. Section 5 presents conclusions.

1. IAC AND MUTUAL INFORMATION

In this section, various embodiments of the present disclosure describe a signal model and an achievable MIB of the IAC receiver. For doing so, the present disclosure considers a downlink MIMO-OFDM system in a multicell environment in which BS 1 110, BS i 120, and BS N 130 that are respectively equipped with $N_t$ transmit antennas respectively transmit messages to a desired UE 200 equipped with $N_r$ receive antennas as shown in FIG. 1.

A $V_i$-dimensional complex signal vector transmitted from BS i 120 at the k-th subcarrier may be assumed to be $X_k^i = [x_k^{i,1}, \ldots, x_k^{i,V_i}]^T$, i=1, 2, ..., N. $x_k^{i,v}$ denotes the v-th spatial layer at the subcarrier k, $V_i$ denotes the number of layers, and $(\bullet)_T$ denotes a transpose of a vector. The symbol $x_k^{i,v}$ may be selected from $M_c^i$-ary constellation set $S_i$. For example, $x_k^{i,v} \in S_i$. Without loss of generality, it may be assumed that N=2, the BS 1 110 is a serving BS, and the BS 2 120 is an interfering BS. A channel model from the BS i 120 to the desired UE 200 at the subcarrier k is expressed as $N_r$-by-$N_t$ channel matrix $G_i^i$. (p, q) entry of the channel matrix $G_i^i$ denotes a path gain from an antenna q of the BS i 110 to an antenna p at the UE, and is modeled as independent complex Gaussian random variables with zero mean and unit variance (e.g., Rayleigh fading). An average transmit power of $x_k^{i,v}$ may be assumed to be normalized to one (e.g., $E[|x_k^{i,v}|^2]=1$, where $E[\bullet]$ denotes an expectation operator and $|\bullet|$ denotes an absolute value of the complex number).

It may be assumed that $r_k$ denotes the $N_r$-dimensional complex received signal vector by the desired UE at the subcarrier k. $r_k$ can be given by Equation 1.

$$r_k = H_k^1 x_k^1 + H_k^2 x_k^2 + n_k, \text{ for } k=1,2,\ldots,K \quad \text{Equation 1}$$

$H_k^i$ denotes an effective channel matrix including an actual channel matrix $G_k^i$ in size $N_r$-by-$N_t$ and a precoding matrix $P_k^i$ in size $N_t$-by-$V_i$, $n_k$ denotes the additive noise vector whose elements are independent and identically-distributed (i.i.d.) complex Gaussian with variance $\sigma_n^2$, and K denotes the total number of the coded subcarriers. It is noted that the actual transmitted signal vector is given by $P_k^i x_k^i$. Because the precoding matrix $P_k^i$ of LTE codebooks is normalized by the number of transmission layers $V_i$, the average (per-user) Signal-to-Noise Ratio (SNR) may be defined as $$\frac{1}{\sigma_n^2}.$$

Under such assumptions, the channel transition probability may be given by Equation 2.

$$p(r_k \mid x_k^1, x_k^2) = \frac{1}{(\pi\sigma_n^2)^{N_r}} \exp\left(-\frac{\|r_k - H_k^1 x_k^1 - H_k^2 x_k^2\|^2}{\sigma_n^2}\right) \quad \text{Equation 2}$$

$H_k^1 x_k^1$ relates to its cell and $H_k^2 x_k^2$ relates to the neighboring cell.

It is given that the m-th bit of a constellation symbol $x_k^{i,v}$ is $b_{k,v,m}^1$. The present disclosure denotes $L(b_{k,v,m}^1)$ as the Log-Likelihood Ratio (LLR) value for the bit $b_{k,v,m}^1$ based on Equation 3.

$$L(b_{k,v,m}^1) = \log\frac{P(b_{k,v,m}^1 = 1)}{P(b_{k,v,m}^1 = 0)} \quad \text{Equation 3}$$

$P(b_{k,v,m}^1 = 0)$ denotes a probability that the random variable $b_{k,v,m}^1$ takes on the value b, b=0 or 1.

The LLR in Equation 3 conditioned on the channel state information may be rewritten as Equation 4.

$$L(b_{k,v,m}^1) = \log\frac{P(b_{k,v,m}^1 = 1 \mid r_k, H_k^1, H_k^2)}{P(b_{k,v,m}^1 = 0 \mid r_k, H_k^1, H_k^2)} \quad \text{Equation 4}$$

Next, assuming the interference-aware ML detection and the i.i.d. uniform coded bits $b_{k,v,m}^1$ without a priori information, the LLRs can be calculated based on Equation 5.

$$L(b_{k,v,m}^1) = \log\frac{\sum_{z_k^1 \in x_1^{v,m}(1)} \sum_{z_k^2 \in x(2)} p(r_k \mid z_k^1, z_k^2)}{\sum_{z_k^1 \in x_0^{v,m}(1)} \sum_{z_k^2 \in x(2)} p(r_k \mid z_k^1, z_k^2)} \quad \text{Equation 5}$$

In Equation 5, x(i) denotes the set of all possible symbol vectors $x_k^i$, which may be obtained as the $V_i$-fold Cartesian product of $S_i$, and $x_k^{v,m}(1)$ denotes a set of all symbol vectors belonging to x(1) whose $b_{k,v,m}^1 = b$ (b=0 or 1).

The BICM separates a MIMO detector and a decoder via a bit-level interleaver, and each coded bit experiences a different quality of channel. As a result of the bit-level interleaver, various embodiments of the present disclosure may assume that all of the bits are independent. By extending the results in the paper of G. Caire, G. Taricco, and E. Biglieri, "Bit-Interleaved Coded Modulation," IEEE Transactions on Information Theory, vol. 44, pp. 927.946, May 1998 and the paper of E. Biglieri, G. Taricco, and E. Viterbo, "Bit-Interleaved Time-Space Codes for Fading Channels," in Conference on Information Sciences and Systems, pp. WA4.1.WA4.6, March 2000, the mutual information of the bit channel for $b_{k,v,m}^1$ may be evaluated based on Equation 6.

$$M_{m,v,m}^{MI} = \quad \text{Equation 6}$$

-continued $$1 - E_{b,x_k^1,x_k^2,r_k,H_k^1,H_k^2}\left[\log_2\frac{\sum_{z_k^1 \in x(1)} \sum_{z_k^2 \in x(2)} p(r_k \mid z_k^1, z_k^2)}{\sum_{z_k^1 \in x_d^{v,m}(1)} \sum_{z_k^2 \in x(2)} p(r_k \mid z_k^1, z_k^2)}\right]$$

Finally, the present disclosure arrives at the MIB of the v-th spatial layer at the k-th subcarrier given by Equation 7.

$$M_{k,v}^{ML} = \frac{\sum_{m=1}^{\log_2 M_c^1} M_{k,v,m}^{MI}}{\log_2 M_c^1} \quad \text{Equation 7}$$

The MIB is dependent on both of the SNR and the Interference-to-Noise Ratio (INR) and varies with the antenna configuration ($N_t$ and $N_r$) and the modulation level ($M_c^1$ and $M_c^2$). To simplify Equation 7, Equation 7 may be represented as $M_k^{ML} = M_{k,v}^{ML}$.

Equation 6 and Equation 7 may generate the exact MIB for the v-th layer at each subcarrier k. However, a main problem with such an approach is that, when evaluating mutual information values in Equation 6, the search candidate number of elements in x(i) may grow exponentially with the number of transmit antennas and/or bits per symbol. The exponential growth of the search candidate number of elements in x(i) prohibitively complicates practical use in the link adaptation and the SLS.

Various embodiments of the present disclosure consider a simple and computationally efficient approach for estimating the MIB of each spatial layer in the MIMO system.

2. CONVENTIONAL STATIC APPROACH TO THE LAYER SEPARATION

Herein, as the first stage of the link performance abstraction of the MIMO-OFDM system, the present disclosure briefly reviews the conventional static approach to the layer separation which derives a post-processing SINR of each spatial layer in the MIMO system.

2.1. Static Combining Approach

As mentioned above, computation of the post-processing SINR in the MIMO system using the MLD may not be straightforward. The present disclosure considers a layer separation method proposed in the paper of S.-H. Moon, K.-J. Lee, J. Kim, and I. Lee, "Link Performance Estimation Techniques for MIMO-OFDM Systems with Maximum Likelihood Receiver" Wireless Communications, IEEE Transactions on, vol. 11, pp. 1808-1816, May 2012, according to which the post-MLD SINR is calculated as a function of the post-MMSE receiver SINR and the genie-aided Interference Free (IF) receiver SINR.

In the MMSE receiver, the post-processing SINR of the v-th layer at the k-th subcarrier may be provided by Equation 8.

$$\gamma_{k,v}^{MMSE} = \frac{1}{\sigma_{k,v}^2} - 1, \text{ for } v = 1, 2, \ldots, V_1 \quad \text{Equation 8}$$

In Equation 8, $\sigma_{k,v}^2$, denotes the Mean-Squared Error (MSE) for the v-th layer at the k-th subcarrier.

Under the assumptions for the signal model of Equation 1, the MSE $\sigma_{k,v}^2$ can be computed based on Equation 9.

$$\sigma_{k,v}^2 = \left[\left(I_{N_t} + \frac{1}{\sigma_n^2}\overline{H}_k^*\overline{H}_k\right)^{-1}\right]_{v,v} \quad \text{Equation 9}$$

In Equation 9, $\overline{H}_k=[H_k^1, H_k^2]$. $(\bullet)^\dagger$ denotes the complex-conjugate transpose, $I_r$ denotes an identity matrix of size r, and $[\bullet]_{n,n}$ denotes an n-th diagonal element of the matrix.

In contrast, the post-MLD SINR can be upper-bounded by the genie-aided IF receiver, and the corresponding SINR of the layer v can be given by Equation 10.

$$\gamma_{k,v}^{IF} = \frac{\|h_{k,v}^1\|^2}{\sigma_n^2}, \text{ for } v = 1, 2, \ldots, V_1 \quad \text{Equation 10}$$

$h_{k,v}^i$ denotes the v-th column of $H_k^i$.

By use of the two SINRs given by Equation 8 and Equation 10, the post-MLD SINR can be lower-and-upper bounded based on Equation 11.

$$F(\gamma_{k,v}^{MMSE}) \le F(\gamma_{k,v}^{ML}) \le F(\gamma_{k,v}^{IF}) \quad \text{Equation 11}$$

In Equation 11, the function F can use different metrics such as channel capacity or MIB. For example, $F(\gamma)=\log_2(\gamma+1)$ or $F(\gamma)=I_{M_c^1}(\gamma)$. The present disclosure focuses on the MIB metric of the function F.

Herein, $I_{M_c}(\gamma)$ denotes the MIB mapping function of the SNR $\gamma$ for the involved modulation level $M_c$ under the assumption of the AWGN channel. Unlike the metric of the channel capacity, the MIB is the constellation-constrained capacity which is dependent on the signal constellation and the bit labeling. An efficient approach for the MIB computation is developed in the paper of R. Srinivasan, "IEEE 802.16m Evaluation Methodology Document (EMD)" IEEE 802.16M-08/004R2, July 2008 by approximating the Probability Density Function (PDF) of the LLR with a mixture of Gaussian PDFs.

The post-MLD SINR may be modeled using a static combining ratio $\beta$ based on Equation 12.

$$F(\gamma_{k,v}^{ML})=(1-\beta)F(\gamma_{k,v}^{MMSE})+\beta F(\gamma_{k,v}^{IF}) \quad \text{Equation 12}$$

$\beta$ denotes a constant value for optimization.

Figure 6:
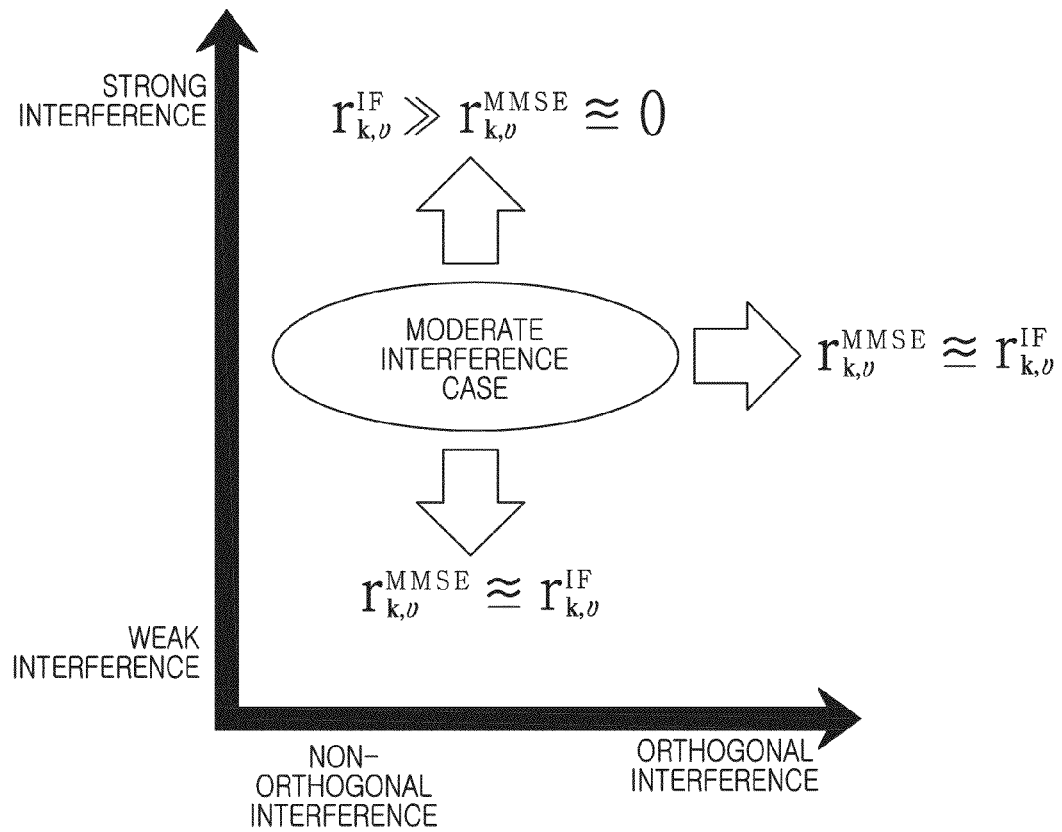
FIG. 6 illustrates upper and lower bounds of a post-processing SINR under interference conditions according to an embodiment of the present disclosure.

2.2. Behavior of $\gamma_{k,v}^{MMSE}$ and $\gamma_{k,v}^{IF}$ in the Interference Environment FIG. 6 illustrates upper and lower bounds of the post-processing SINR under interference conditions according to an embodiment of the present disclosure.

In this subsection, the present disclosure shows that the constant $\beta$-based approach of Equation 12 has an inherent drawback in the strong interference. For doing so, the present disclosure takes an information-theoretic view of the two bounds $\gamma_{k,v}^{MMSE}$ and $\gamma_{k,v}^{IF}$ in three extreme interference cases including weak interference, strong interference, and orthogonal interference. The interference environments may be divided into two regimes of a moderate interference regime and an extreme interference regime as shown in FIG. 6. It is noted that the lower bound changes as the interference condition moves from the moderate case to the three extreme cases while the upper bound remains unchanged. To simplify the analysis, it is assumed that a single-layer transmission for each user, that is, $V_i=1$ though the results can be generated to the case with $V_i\ge 1$. In this case, the system model of Equation 1 may be reduced to Equation 13.

$$r_k=h_k^1 x_k^1+h_k^2 x_k^2+n_k \quad \text{Equation 13}$$

First, the orthogonal interference is considered. When a subspace spanned by a serving channel $h_k^1$ becomes more orthogonal to a subspace of an interfering channel $h_k^2$, the MMSE receiver performs asymptotically the same as the genie-aided IF receiver. This is consistent with the fact that the lower bound $\gamma_{k,v}^{MMSE}$ of Equation 8 is coincident with the upper bound $\gamma_{k,v}^{IF}$ of Equation 10 when $(h_k^1)^\dagger h_k^2=0$.

Next, it is assumed that the UE is physically closer to the serving BS than to the interfering BS and accordingly the received signal from the interfering BS is much smaller than the received signal from the serving BS. Under such a week interference condition, treating the interference as noise is near-optimal in terms of the system throughput. This is consistent with the fact that the lower bound $\gamma_{k,v}^{MMSE}$ practically coincides with the upper bound $\gamma_{k,v}^{IF}$ as the interfering part $h_k^2 x_k^2$ of Equation 13 becomes asymptotically negligible.

One important feature to notice in relation to Equation 12 is that, as long as the lower bound $\gamma_{k,v}^{MMSE}$ is the same as the upper bound $\gamma_{k,v}^{IF}$, Equation 12 yields $\gamma_{k,v}^{ML}$ the same as $\gamma_{k,v}^{MMSE}$ and $\gamma_{k,v}^{IF}$ regardless of $\beta$. Such a feature implies that the layer separation method based on Equation 12 may obtain an accurate estimate of the post-MLD SNR, $\gamma_{k,v}^{ML}$ in the weak and orthogonal interferences where $\gamma_{k,v}^{ML}$ is the same as $\gamma_{k,v}^{MMSE}$ and $\gamma_{k,v}^{IF}$ for any value of $\beta$.

Finally, the interference channels under very strong interference are considered. The work of A. Carleial "A case where interference does not reduce capacity (corresp.)," Information Theory, IEEE Transactions on, vol. 21, pp. 569. 570, September 1975 shows that very strong interference is equivalent to no interference. The paper of H. Sato "The capacity of the Gaussian interference channel under strong interference (corresp.)," Information Theory, IEEE Transactions on, vol. 27, pp. 786-788, November 1981 extends the work to the interference channels with the strong interference. In other words, the message $x_k^1$ can be recovered reliability under the strong interference at the same rate which is achievable in the absence of the interference $h_k^2 x_k^2$. This implies that the lower bound $\gamma_{k,v}^{MMSE}$ should converge to the upper bound $\gamma_{k,v}^{IF}$ in the strong interference region so that the conventional static approach can work properly. However, Equation 9 indicates that the actual lower bound $\gamma_{k,v}^{MMSE}$ decreases to zero asymptotically when the interfering part $h_k^2 x_k^2$ becomes stronger. Thus, the conventional approach based on the static ratio $\beta$ can lead to the wrong layer separation in the strong interference case.

In the following section, various embodiments of the present disclosure provide a new adaptive approach for adaptively calculating the combining ratio based on the instantaneous ISR.

3. THE PRESENT ISR-ADAPTIVE APPROACH TO THE LAYER SEPARATION

In this section, various embodiments of the present disclosure provide an adaptive approach to the layer separation for the MIMO system which overcomes the drawback of the conventional static approach. According to various embodiments of the present disclosure, the link performance abstraction of the present disclosure basically includes the stages of FIG. 2.

Referring to FIG. 2, at operation S100, the layer separation of the MIMO system may be performed. For example, operation S100 can be performed as shown in FIG. 3.

Figure 4A:
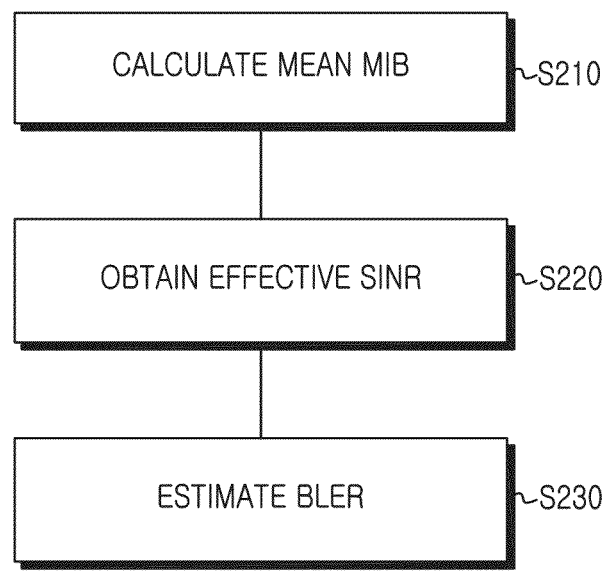
FIGS. 4A and 4B illustrate effective Signal-to-Interference-plus-Noise Ratio (SINR) mapping for a link performance abstraction according to an embodiment of the present disclosure.
Figure 4B:
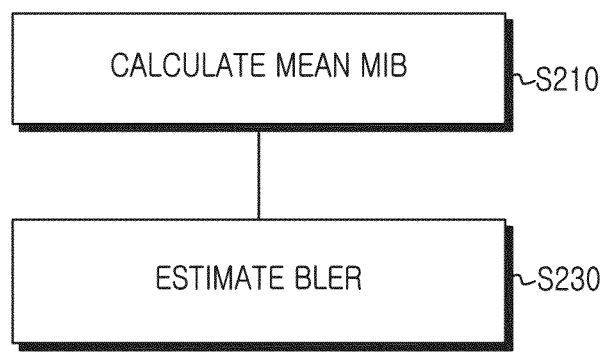

At operation S200, the effective SINR mapping in the OFDM block may be performed. For example, operation S200 can be carried out as shown in FIGS. 4A and 4B.

Figure 3:
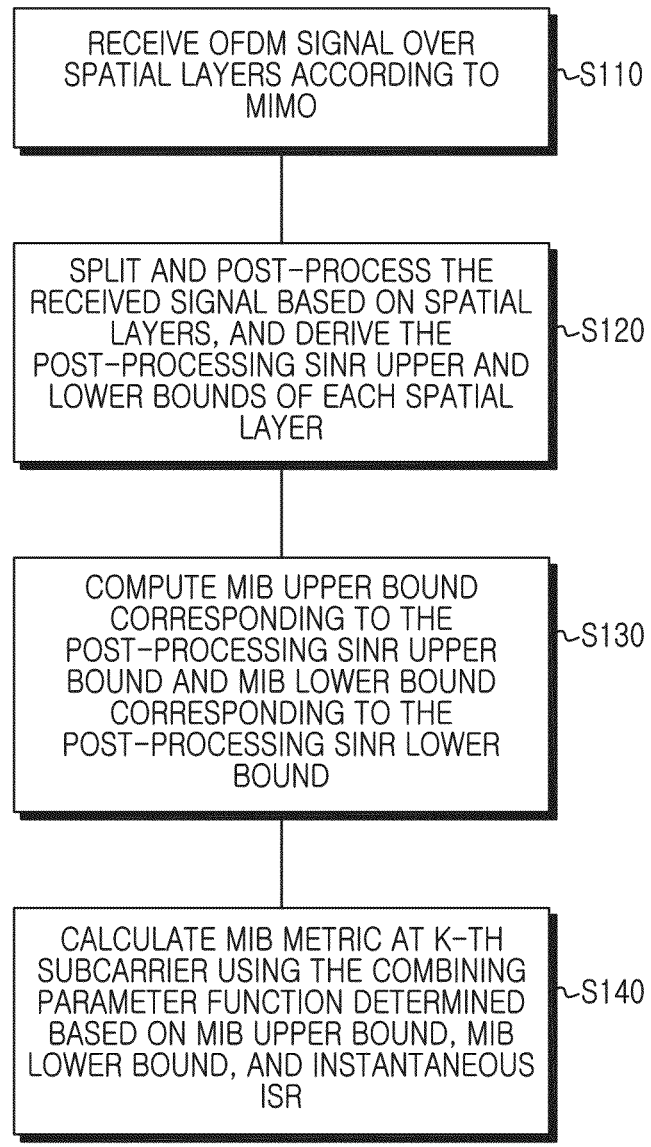
FIG. 3 illustrates layer separation for a link performance abstraction according to an embodiment of the present disclosure.

FIG. 3 illustrates layer separation for a link performance abstraction according to an embodiment of the present disclosure.

Referring to FIG. 3, at operation S110, the OFDM signal is received over the plurality of spatial layers according to the MIMO.

At operation S120, the received signal is split and post-processed based on the spatial layer and the post-processing SINR of each spatial layer is derived. For example, the post-processing SINR can be obtained using the ML detection. The post-processing SINR can range from the upper bound and the lower bound of the post-processing SINR. The upper bound of the post-processing SINR can be set to the SINR value of the interference-free receiver (e.g., the IF receiver), and the lower bound of the post-processing SINR can be set to the SINR value of the most-interfered receiver (e.g., the MMSE receiver). Operation S120 is related to Equation 8, Equation 10, and Equation 11.

At operations S130 and S140, the method converts the post-processing SINR of each spatial layer to the MIB metric, which is adaptively controlled base on the instantaneous ISR. More specifically, the post-processing SINR of the spatial layers is converted to the MIB metric by computing an MIB upper bound corresponding to the upper bound of the post-processing SINR and an MIB lower bound corresponding to the lower bound of the post-processing SINR at operation S130 and calculating the MIB metric at the k-th subcarrier using the combining parameter function determined based on the MIB upper bound, the MIB lower bound, and the instantaneous ISR at operation S140. Operation S130 is based on Equation 14 and Equation 15, and operation S140 is based on Equation 16 and Equation 17 to be explained.

For example, the combining parameter can be determined based on the instantaneous ISR, the MSC of the serving BS, and the modulation order of the interfering BS. The instantaneous ISR can asymptotically reduce to zero in the weak interference condition and asymptotically increase to 1 in the strong interference condition.

FIGS. 4A and 4B illustrate effective SINR mapping for a link performance abstraction according to an embodiment of the present disclosure.

Referring to FIGS. 4A and 4B, the effective SINR mapping for the link performance abstraction may corresponds to the BLER estimation from the mean of the MIB metrics of the spatial layers.

Referring to FIG. 4A, the BLER estimation may include operations S210, S220, and S230.

At operation S210, the mean of the MIB metrics of the spatial layers is calculated.

At operation S220, the effective SINR from the mean of the MIB metrics is calculated.

At operation S230, the BLER is estimated using the effective SINR based on Equation 23, Equation 24, and Equation 25 to be explained.

Referring to FIG. 4B, the BLER estimation may include operations S210 and S230.

At operation S210, the mean of the MIB metrics of the spatial layers is calculated.

At operation S230, the BLER is estimated using the mean of the MIB metrics based on Equation 23 and Equation 26 to be explained.

Figure 5:
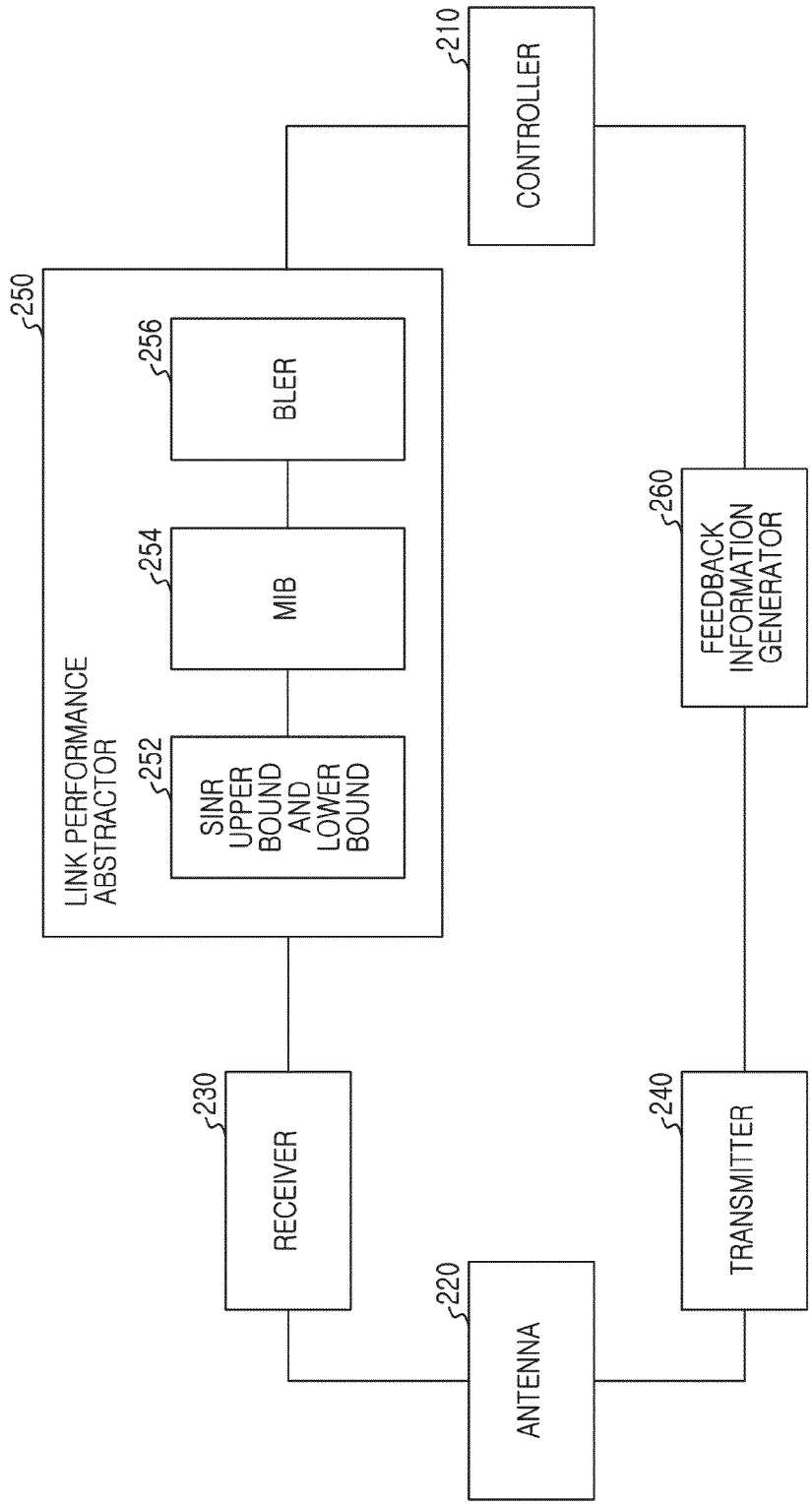
FIG. 5 illustrates an apparatus for a link performance abstraction according to an embodiment of the present disclosure.

FIG. 5 depicts a receiving apparatus for a link performance abstraction according to an embodiment of the present disclosure.

Referring to FIG. 5, the configuration of the receiving apparatus is a mere example and other configurations may be used without departing from the spirit and scope of the present disclosure. The receiving apparatus can be embedded in the UE 200 of FIG. 1.

Referring to FIG. 5, the receiving apparatus includes a controller 210, an antenna 220, a receiver 230, a transmitter 240, a link performance abstractor 250, and feedback information generator 260.

According to various embodiments of the present disclosure, the antenna 220 may include a plurality of antenna arrays for transmitting and receiving the MIMO signals.

According to various embodiments of the present disclosure, the receiver 230 processes the signal received over the antenna 220. For example, the receiver 230, which processes the received signal in radio frequency and baseband, processes the received signal according to the OFDM.

According to various embodiments of the present disclosure, the transmitter 240 processes the signal to transmit over the antenna 220. For example, the transmitter 240 for processing the signal to transmit in the radio frequency and the baseband, processes the transmit signal according to the OFDM.

According to various embodiments of the present disclosure, the link performance abstractor 250 may include an SINR upper and lower bound extractor 252, an MIB metric calculator 254, and a BLER estimator 256.

According to various embodiments of the present disclosure, the feedback information generator 260 generates feedback information with the link performance information (e.g., the CQI) abstracted by the link performance abstractor 250 under control of the controller 210. The generated feedback information can be transmitted to the BS and used for the link adaptation process.

Although it is not depicted in FIG. 5, various tables may be used for the link performance abstractor 250. For example, an AWGN table, a table for the MIB metric calculator 254, a table for the BLER estimator 256, and a table for the feedback information generator 260 to be explained may be used for the link performance abstractor 250.

According to various embodiments of the present disclosure, the receiver 230 receives the OFDM signal via the plurality of the spatial layers.

According to various embodiments of the present disclosure, the SINR upper and lower bound extractor 252 splits and post-processes the received signal per spatial layer and calculates the upper and lower bounds of the post-processing SINR of the spatial layers. The upper bound of the post-processing SINR can be set to the SINR value of the interference-free receiver (e.g., the IF receiver), and the lower bound of the post-processing SINR can be set to the SINR value of the most-interfered receiver (e.g., the MMSE receiver).

According to various embodiments of the present disclosure, the MIB metric calculator 254 converts the post-processing SINR of the spatial layers to the MIB metric adaptively adjusted based on the instantaneous ISR. For example, the MIB metric calculator 254 calculates the MIB upper bound corresponding to the upper bound of the post-processing SINR and the MIB lower bound corresponding to the lower bound of the post-processing SINR, and calculates the MIB metric using the function of the combining parameter determined based on the MIB upper bound, the MIB lower bound, and the instantaneous ISR. For example, the combining parameter can be determined based on the instantaneous ISR, the MSC of the serving BS, and the modulation order of the interfering BS. The instantaneous ISR can asymptotically reduce to zero in the weak interference condition and asymptotically increase to 1 in the strong interference condition.

According to various embodiments of the present disclosure, the BLER estimator 256 estimates the BLER from the mean of the MIB metrics of the spatial layers. For example, the BLER estimator 256 calculates the mean of the MIB metrics of the spatial layers, calculates the effective SINR from the mean of the MIB metrics, and estimates the BLER from the effective SINR. For example, the BLER estimator 256 calculates the mean of the MIB metrics of the spatial layers and estimates the BLER from mean of the MIB metrics.

3.1. Present Adaptive Approach

The lower bound and the upper bound to the post-MLD MIB denoted by $M_k^{ML}$ are given by mapping the corresponding SINR bound to MIB values respectively based on Equation 14 and Equation 15.

$$M_k^{low} = I_{M_c}^{-1}(\gamma_k^{MMSE}) \quad \text{Equation 14}$$

$$M_k^{up} = I_{M_c}^{-1}(\gamma_{k,v}^{IF}) \quad \text{Equation 15}$$

To approximate the MIB mapping function $I_{M_c}^{-1}(\gamma)$, the present disclosure uses the closed-form expressions suggested in Table 28 of the paper of R. Srinivasan "IEEE 802.16m Evaluation Methodology Document (EMD)" IEEE 802.16M-08/004R2, July 2008. It is noted that the computation of $M_k^{up}$ and $M_k^{low}$ respectively from $\gamma_k^{IF}$ and $\gamma_k^{MMSE}$ does not depend on the interfering modulation $M_c^2$.

By applying the MIB metric $F(\gamma) = I_{M_c}^{-1}(\gamma)$, Equation 12 can be rewritten as Equation 16.

$$M_k^{ML} = (1-\beta_{ISR})M_k^{low} + \beta_{ISR}M_k^{up} \quad \text{Equation 16}$$

In Equation 16, the subscript ISR is used to emphasize the dependency on the ISR. As seen from the definition, the parameter $\beta_{ISR}$ cannot be larger than 1 ($\beta_{ISR} \leq 1$).

Figure 7:
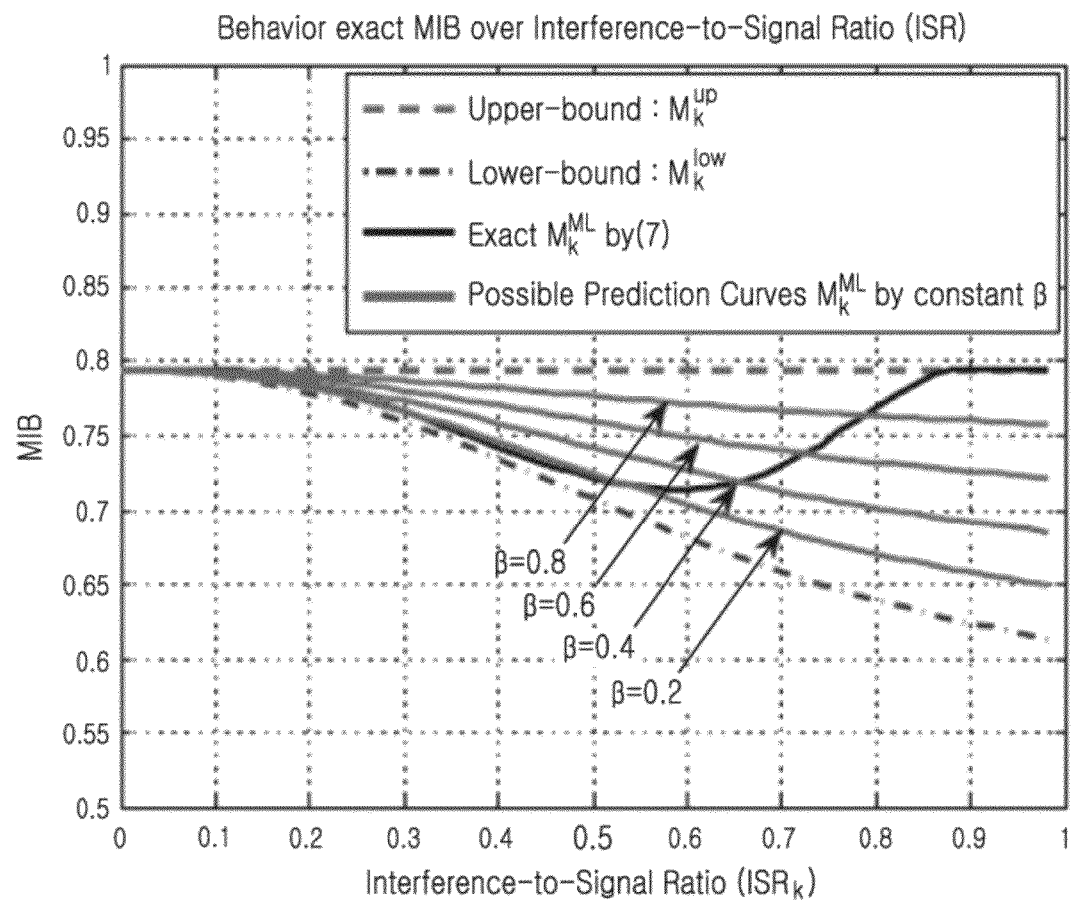
FIG. 7 illustrates post-Maximum-Likelihood Detection (MLD) Mutual Information per coded Bit (MIB) over Interference-to-Signal Ratio (ISR) according to an embodiment of the present disclosure.

FIG. 7 illustrates post-MLD MIB over ISR according to an embodiment of the present disclosure.

As shown in the subsection 2.2, the conventional static combining approach is not able to accommodate the probabilistic behavior of the optimal $\beta_{ISR}$ in the storing interference scenarios.

Referring to FIG. 7, the extract MIB $M_k^{ML}$ given by Equation 7 is illustrated for one specific channel realization $h_k^1$ and $h_k^2$ with respect to the ISR, comparing with the upper and lower bounds. Motivated by the Chernoff bound expression on pairwise error probability in Rayleigh fading channels, various embodiments of the present disclosure may assess the BLER performance improvement (e.g., success probability) due to the increased ISR by extending the Chernoff bound by the ISR factor based on Equation 17.

$$ISR_k = 1 - \exp\left(-\frac{\|h_k^2\|}{\|h_k^1\|}\right) \quad \text{Equation 17}$$

Based on the definition of the ISR in Equation 17, $ISR_k$ ranges between 0 and 1 (e.g., $0 \leq ISR_k \leq 1$).

FIG. 7 shows that the exact $M_k^{ML}$ can be approximated by a constant $\beta_{ISR}$ value for the low ISR (e.g., $\beta_{ISR} = 0.2$ for $ISR_k \leq 0.5$). Meanwhile, the combining ratio $\beta_{ISR}$ continues to increase to 1 with the increasing $ISR_k$ in FIG. 7. From this observation, it can be concluded that the conventional static approach based on the constant $\beta$ cannot capture the behavior of the exact MIB $M_k^{ML}$ especially in high ISR regimes. The observation suggests that the combining parameter $\beta_{ISR}$ needs to be adaptively chosen according to the instantaneous ISR.

In order to adaptively choose the combining parameter $\beta_{ISR}$ according to the instantaneous ISR, various embodiments of the present disclosure provides the following ISR-adaptive parameterization of $\beta_{ISR}$ based on Equation 18.

$$\beta_{ISR} = B(ISR_k, MCS_1, M_c^2) \quad \text{Equation 18}$$

In Equation 18, $M_c^2$ denotes the modulation order of the interfering BS.

Figure 8:
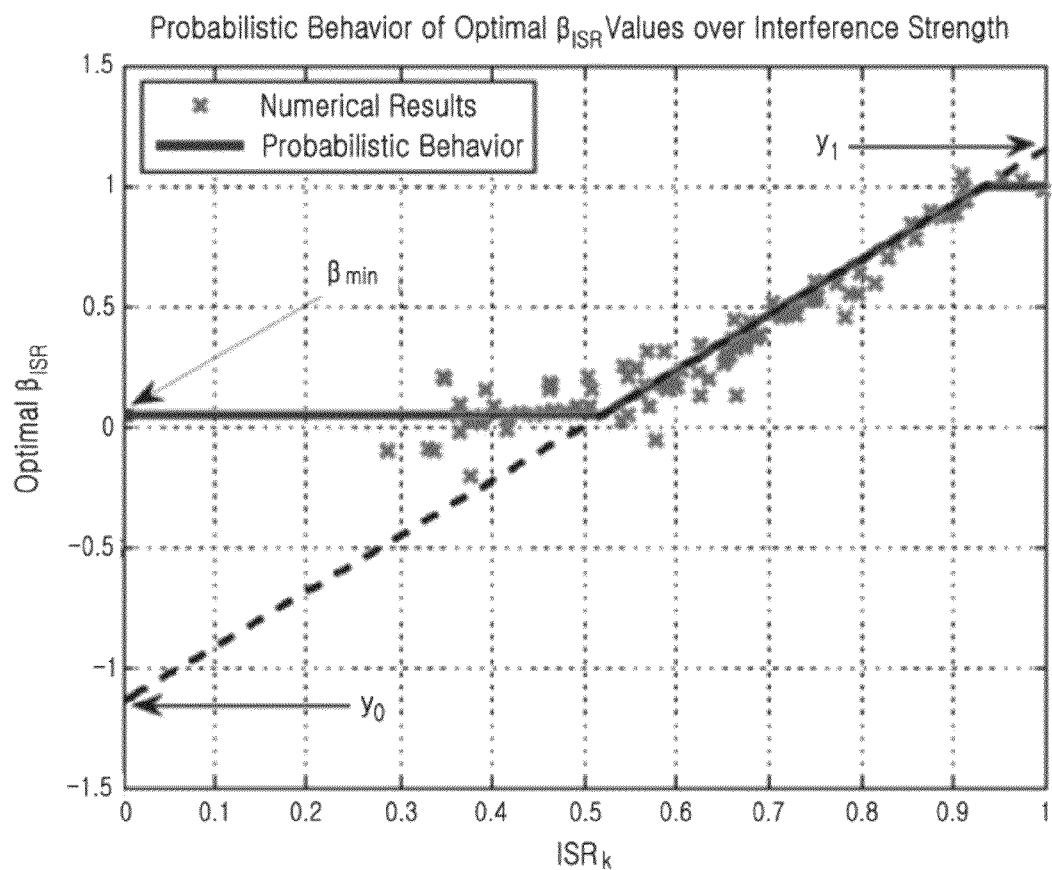
FIG. 8 illustrates a combining parameter $\beta_{ISR}$ over an ISR according to an embodiment of the present disclosure.

To characterize the probabilistic behavior of the optimal $\beta_{ISR}$ in Equation 16 over $ISR_k$, various embodiments of the present disclosure present the numerical results for the case of $MCS_1 = 9$ and $M_c^2$, =4QAM in FIG. 8.

FIG. 8 illustrates a combining parameter $\beta_{ISR}$ over an ISR according to an embodiment of the present disclosure.

By applying Monte-Carlo simulations to Equation 6, the exact MIB $M_k^{ML}$ can be obtained from Equation 7 for the given channel realization. The corresponding two bounds $M_k^{low}$ and $M_k^{up}$ are computed. Next, the optimal $\beta_{ISR}$ value which satisfies Equation 16 is obtained. FIG. 8 depicts the optimal $\beta_{ISR}$ values with respect to $ISR_k$ for 100 channel realizations $h_k^1$ and $h_k^2$ which achieve the MIB values corresponding to the target BLER in the AWGN reference curve of the involved $MCS_1$. In FIG. 8, the target BLER of interest is $10^{-1.1}$ to $10^{-0.9}$ and accordingly the related SINR range is −2 dB to 10 dB.

Referring to FIG. 8, the optimal $\beta_{ISR}$ is well approximated by a single constant value for the low IRS and increase linearly to 1 as the ISR grows. The probabilistic behavior of the optimal $\beta_{ISR}$ is in line with the discussion aforementioned in FIG. 7. Next, based on the observation, the optimal $\beta_{ISR}$ behavior can be approximated by the following piecewise approximation represented by the solid line in FIG. 8 based on equation 19.

$$\beta_{ISR} = \max\{\min\{(y_1-y_0)ISR_k + y_0, 1\}\beta_{min}\} \quad \text{Equation 19}$$

It is noted that the simplification of $\beta_{ISR}$ in Equation 19 can be also justified by the fact that, as shown in the subsection 2.2, the accuracy of the layer separation based on Equation 12 becomes less sensitive with the decreasing ISR. The accuracy of the layer separation based on Equation 12 becomes less sensitive with the decreasing ISR because the lower bound $\gamma_{k,v}^{MMSE}$ approaches the upper bound $\gamma_{k,v}^{IF}$ at the low ISRs.

Equation 19 corresponds to the modeled equation of the solid line of FIG. 8.

3.2. Generalization to the Case of $V_1 \geq 1$ and $V_2 \geq 1$

Various embodiments of the present disclosure can be extended for arbitrary numbers of transmission layers $V_1 \geq 1$ and $V_2 \geq 1$. In this subsection, for example, a brief description of generalization to the case of $V_1 \leq 2$ and $V_2 \leq 2$ is provided. The layer separation of multiple-layer cases proceeds in the same fashion as the single-layer case while the following modifications are required. The system model can be rewritten as Equation 20 and Equation 21.

$$r_k = H_k^1 x_k^1 + H_k^2 x_k^2 + n_k \quad \text{Equation 20}$$

$$r_k = [h_{k,1}^1 \; h_{k,2}^1]\begin{bmatrix}x_k^{1,1}\\x_k^{1,2}\end{bmatrix} + [h_{k,1}^2 \; h_{k,2}^2]\begin{bmatrix}x_k^{2,1}\\x_k^{2,2}\end{bmatrix} + n_k \quad \text{Equation 21}$$

By focusing on the first transmission layer of the desired UE, the definition of $ISR_k$ in Equation 17 can be extended to Equation 22.

$$ISR_k = 1 - \exp\left(-\frac{\|H_k^{2,eff}\|_F}{\|h_{k,1}^1\|}\right)$$ Equation 22

$\|\cdot\|$ denotes Frobenius norm, and $H_k^{2,eff}$ denotes the effective interference channel matrix defined as $H_k^{2,eff}=[H_k^2]$ and $H_k^{2,eff}=[h_{k,2}^1, H_k^2]$ respectively for V=1 and $V_2$=1.

3.3. Effective SINR Mapping (ESM)

When one codeword in a coded OFDM system is transmitted over the subcarriers having different channel gains, the ESM is required to map the post-processing MIB values across the subcarriers into a single SINR value, which is used to estimate instantaneous BLER of the link by looking up the AWGN reference curve.

The link performance abstraction is given as a function of the MIB values $M_k^{ML}$ across the subcarriers belonging to one codeword. When the post-MLD MIB values $\{M_k^{ML}\}_{k=1}^K$ over the K-ary subcarriers are obtained, a Mean MIB (MMIB) denoted by $M_{mmib}^{ML}$ is computed based on Equation 23.

$$M_{mmib}^{ML} = \frac{1}{K}\sum_{k=1}^{K} M_k^{ML}$$ Equation 23

Next, $M_{mmib}^{ML}$ can be inversely mapped to obtain the effective SINR based on Equation 24.

$$SINR_{eff} = I_{M_c}^{-1}(M_{mmib}^{ML})$$ Equation 24

Finally, the estimate of the BLER can be obtained by mapping $SINR_{eff}$ to the BLER by looking up the AWGN look-up table based on Equation 25.

$$BLER_{est} = LUT_{AWGN}(SINR_{eff}, MCS_1)$$ Equation 25

$LUT_{AWGN}$ denotes the mapping function which is specific to the involved MCS and code length. The mapping function needs to be acquired in advance from the LLS over the AWGN channel for all specific conditions of interest.

A direct MMIB to BLER relationship can be used to directly map $M_{mmib}^{ML}$ to the estimated LBER based on Equation 26. Equation 26 follows the paper of R. Srinivasan "IEEE 802.16m Evaluation Methodology Document (EMD)" IEEE 802.16M-08/004R2, July 2008.

$$BLER_{est} = LUT_{AWGN}^{mmib}(M_{mmib}^{ML}, MCS_1)$$ Equation 26

$LUT_{AWGN}^{mmib}(M_{mmib}^{ML}, MCS_1)$ can be derived from the two functions $I_{M_c}(\gamma)$ and $LUT_{AWGN}(SNR,MCS)$ In summary, as the noise effect of the SNR and the INR is captured in Equation 8 and Equation 10, the link abstraction method according to various embodiments of the present disclosure may reference (e.g., require) only the table of three parameters $y_0$, $y_1$, and $\beta_{min}$ for each set of $MCS_1$ and $M_c^2$ along with the MIB and AWGN reference tables for $I_{M_c}(\gamma)$ and $LUT_{AWGN}(SNR,MCS)$.

4. DISCUSSION AND NUMERICAL RESULTS

In this section, the performance of the ISR-adaptive link abstraction method according to various embodiments of the present disclosure is evaluated in contrast to the conventional static method, to demonstrate the efficacy of the method according to various embodiments of the present disclosure. In addition, the present link abstraction method according to various embodiments of the present disclosure is applied to the SLS. In order to apply the link abstraction method according to various embodiments of the present disclosure to the SLS, tuning the model parameters $y_0$, $y_1$, and $\beta_{min}$ by training the present link abstraction method of Equation 19 under the advanced IAC receiver with the closed-loop 2-by-2 MIMO configuration specified for the LET system may be necessary. Unless otherwise stated, LTE 3rd Generation Partnership Project (3GPP) specifications (series 36) are assumed as the baseline for the following discussion and simulations.

The objective of the link model training is two-folded. First, the training is considered as a process of tuning the model parameters to capture non-ideal effects in the link performance abstraction, including non-linear MMIB procedure of Equation 23 and Equation 24 and non-Gaussian Interference against the use of the AWGN reference curves of Equation 25. Second, in contrast to the first objective, the training aims to avoid overestimation of the link performance by taking into account practical implementation issues in the IAC receiver. For example, in order to reduce the receiver complexity, the max-log approximation may be assumed to be applied both for demodulation and decoding so as to avoid the logarithm of a sum of exponential functions in the LLR computation. In this case, the link abstraction based on the theoretical MIB will overestimate the link performance and thus tuning the parameter $\beta_{ISR}$ obtained by the MIB analysis in Section 3 may be necessary.

As a result, the training allows the link abstraction model to have the best model parameters for minimizing the error between the estimated BLER $BLER_{est}$ given by Equation 25 and the actual BLER obtained from the link-level simulations. The tuned parameter $\beta_{ISR}^{tuned}$ is obtained through numerical fitting. Details are outlined by the pseudo-code shown in Algorithm 1 of Table 1.

TABLE 1

Algorithm 1 Link Model Training($y_0^{tuned}, y_1^{tuned}, \beta_{min}^{tuned}$)

1: procedure FITTING($S_{channel}, S_{snr}, S_{y_0, y_1, \beta_{min}}, MCS_1, M_c^2$)
2:    min ← ∞
3:    for all ($y_0, y_1, \beta_{min}$) ∈ $S_{y_0, y_1, \beta_{min}}$ do
4:      mse ← 0
5:      for all $\{h_k^1, h_k^2\}_{k=1}^K \in S_{channel}$ and $\sigma_n^2 \in S_{snr}$ do
6:        for k ← 1, K do
7:           $M_k^{low} \leftarrow I_{M_c}\left(\gamma_k^{MMSE} \leftarrow \frac{1}{\sigma_k^2} - 1\right)$
8:           $M_k^{up} \leftarrow I_{M_c}\left(\gamma_k^{IF} \leftarrow \frac{\|h_k^1\|^2}{\sigma_n^2}\right)$
9:           $ISR_k \leftarrow 1 - \exp\left(-\frac{\|h_k^2\|^2}{\|h_k^1\|}\right)$
10:           $\beta_{ISR} \leftarrow \min\{(y_1 - y_0) ISR_k + y_0, 1\}$
11:           $\beta_{ISR} \leftarrow \max\{\beta_{ISR}, \beta_{min}\}$
12:           $M_k^{ML} \leftarrow (1 - \beta_{ISR})M_k^{low} + \beta_{ISR}M_k^{up}$
13:        end for
14:        $M_{mmib}^{ML} \leftarrow \frac{1}{K}\sum_{k=1}^{K} M_k^{ML}$
15:        $SINR_{eff} \leftarrow I_{M_c}^{-1}(M_{mmib}^{ML})$
16:        $BLER_{est} \leftarrow LUT_{AWGN}(SINR_{eff}, MCS_1)$
17:        mse ← mse + |log $BLER_{est}$ − log $BLER_{monte}|^2$
18:      end for
19:      if min > mse then
20:        min ← mse
21:        ($y_0^{tuned}, y_1^{tuned}, \beta_{min}^{tuned}$) ← ($y_0, y_1, \beta_{min}$)
22:      end if
23:    end for TABLE 1-continued Algorithm 1 Link Model Training($y_0^{tuned}, y_1^{tuned}, \beta_{min}^{tuned}$)

Figure 9:
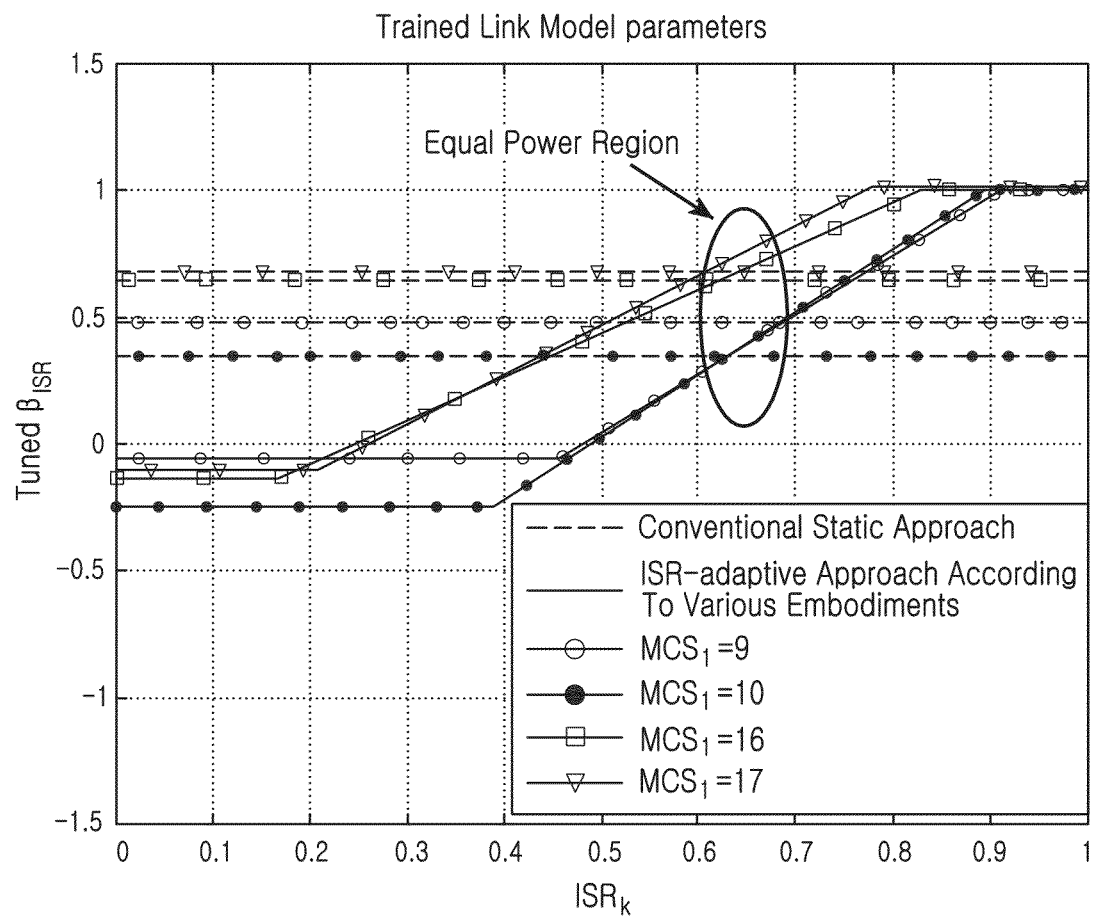
FIG. 9 illustrates trained link model parameters of a present adaptive approach and a static approach according to an embodiment of the present disclosure.

24:     return ($y_0^{tuned}, y_1^{tuned}, \beta_{min}^{tuned}$)
25:     end procedure FIG. 9 illustrates trained link model parameters of a present adaptive approach and a static approach according to an embodiment of the present disclosure.

Referring to Table 1, the simulated BLER denoted by $BLER_{monte}$ is obtained by Monte-Carlo simulation from the LLS over the SNR region of interest $S_{snr}$ for each realization $[h_k^1, h_k^2]_{k=1}^K$ of 100 randomly generated OFDM channel realizations $S_{channel}$. Referring to FIG. 9, the trained link model $\beta_{ISR}^{tuned}$ given by the tuned parameters ($y_0^{tuned}, y_1^{tuned}, \beta_{min}^{tuned}$) is illustrated for a few representative $MCS_1$'s with $M_c^2$=4QAM. For the comparison, plots corresponding to the conventional static approach are added. As shown in FIG. 9, two lines of the adaptive and static model parameters intersect each other in an equal power region around $ISR_k$=1−exp(−1)=0.632. This observation shows that the conventional static approach tends to find the parameter β optimal for the case of $\|h_k^1\| \approx \|h_k^2\|$.

Now, the tuned $\beta_{ISR}^{tuned}$ of FIG. 9 corresponding to the case of $MCS_1$=9 is compared with the probabilistic behavior of the optimal $\beta_{ISR}$ values given in FIG. 7. The tuned $\beta_{ISR}^{tuned}$ of FIG. 9 corresponding to the case of $MCS_1$=9 and the probabilistic behavior of the optimal $\beta_{ISR}$ values given in FIG. 7 are derived independently. From the comparison, the turned $\beta_{ISR}^{tuned}$ matches well with the probabilistic behavior of the optimal $\beta_{ISR}$ values, which justifies the analysis in Section 3. Herein, the training can cause the tuned $\beta_{ISR}^{tuned}$ to be slightly lower than the optimal $\beta_{ISR}$ due to the non-ideal implementations of the detection and the decoding. FIG. 9 shows that the resultant tuned parameter $\beta_{ISR}^{tuned}$ can become less than zero at the low ISR. It is noted in Equation 16 that a negative $\beta_{ISR}^{tuned}$ does not mean that the value of $M_k^{ML}$ is negative, but means that $M_k^{ML}$ is smaller than $M_k^{low}$.

The optimal parameters ($y_0^{tuned}, y_1^{tuned}, \beta_{min}^{tuned}$) guarantee that, with the increasing number of the channel realizations and the noise realizations for the Monte-Carlo simulations, the simulated BLER converges asymptotically to the predicted BLER given by Equation 27.

$$BLER_{monte} \approx BLER_{est} \quad \text{Equation 27}$$

Hereinafter, the predicted $BLER_{est}$ is compared with the simulated $BLER_{monte}$ by using new channel realizations generated independently of $S_{channel}$ used for tuning $\beta_{ISR}^{tuned}$ in Algorithm 1. Details of the PHY abstraction are given in Algorithm 2 of Table 2.

TABLE 2

Algorithm 2 Link Performance Abstraction

1:   procedure ABSTRACTION($\{h_k^1, h_k^2\}_{k=1}^K, \sigma_n^2, MCS_1, M_C^2$)
2:   ($y_0^{tuned}, y_1^{tuned}, \beta_{min}^{tuned}$) ← $\beta_{ISR}^{tuned}$ ($MCS_1, M_C^2$)
3:   for k ← 1, K do
4:     $M_k^{low} \leftarrow \mathcal{I}_{M_c^1}^{-1}\left(\gamma_k^{MMSE} \leftarrow \frac{1}{\sigma_k^2} - 1\right)$
5:     $M_k^{up} \leftarrow \mathcal{I}_{M_c^1}^{-1}\left(\gamma_k^{IF} \leftarrow \frac{\|h_k^1\|^2}{\sigma_n^2}\right)$ TABLE 2-continued Algorithm 2 Link Performance Abstraction 6:     $ISR_k \leftarrow 1 - \exp\left(-\frac{\|h_k^2\|}{\|h_k^1\|}\right)$
7:     $\beta_{ISR} \leftarrow \min\{(y_1^{tuned} - y_0^{tuned}) ISR_k + y_0^{tuned}, 1\}$
8:     $\beta_{ISR} \leftarrow \max\{\beta_{ISR}, \beta_{min}^{tuned}\}$
9:     $M_k^{ML} \leftarrow (1 - \beta_{ISR})M_k^{low} + \beta_{ISR}M_k^{up}$
10:   end for
11:   $M_{mmib}^{ML} \leftarrow \frac{1}{K}\sum_{k=1}^{K} M_k^{ML}$
12:   $SINR_{eff} \leftarrow \mathcal{I}_{M_c^1}^{-1}(M_{mmib}^{ML})$
13:   $BLER_{est} \leftarrow LUT_{AWGN}(SINR_{eff}, MCS_1)$
14:   return $BLER_{est}$
15:   end procedure FIGS. 10 and 11 illustrate performance comparison between an adaptive approach and a static approach according to an embodiment of the present disclosure.

Figure 10:
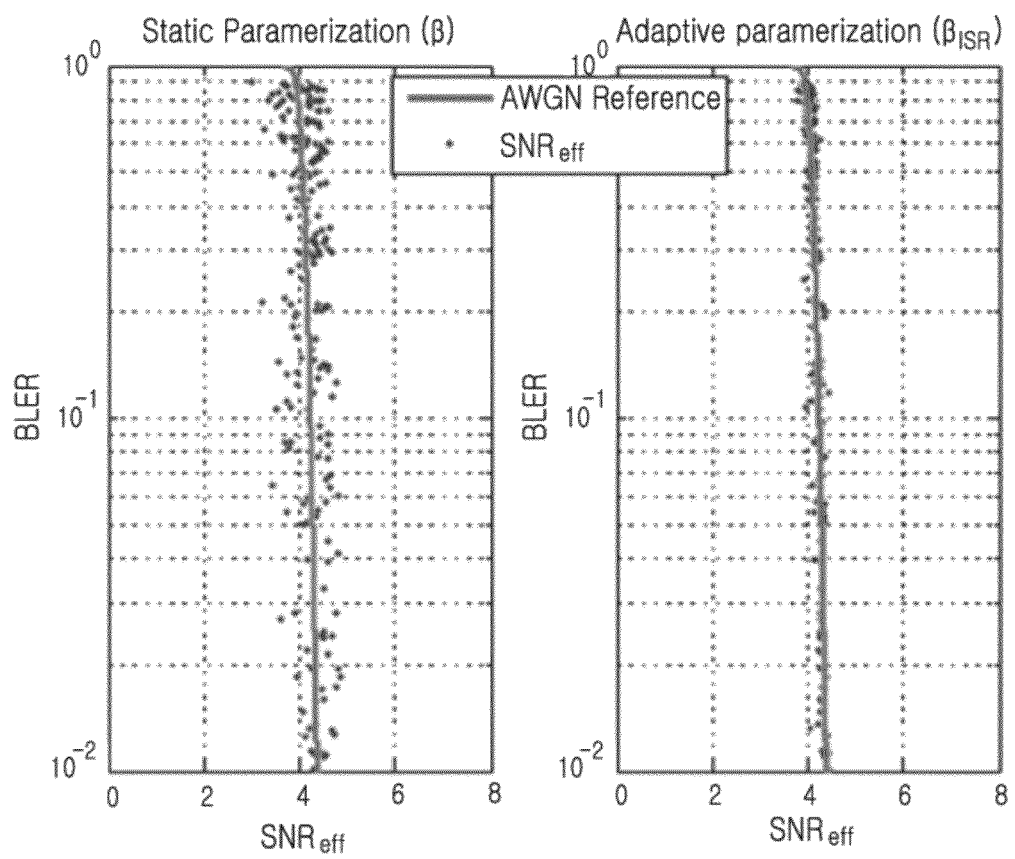
FIGS. 10 and 11 illustrate performance comparison between an adaptive approach and a static approach according to an embodiment of the present disclosure.
Figure 11:
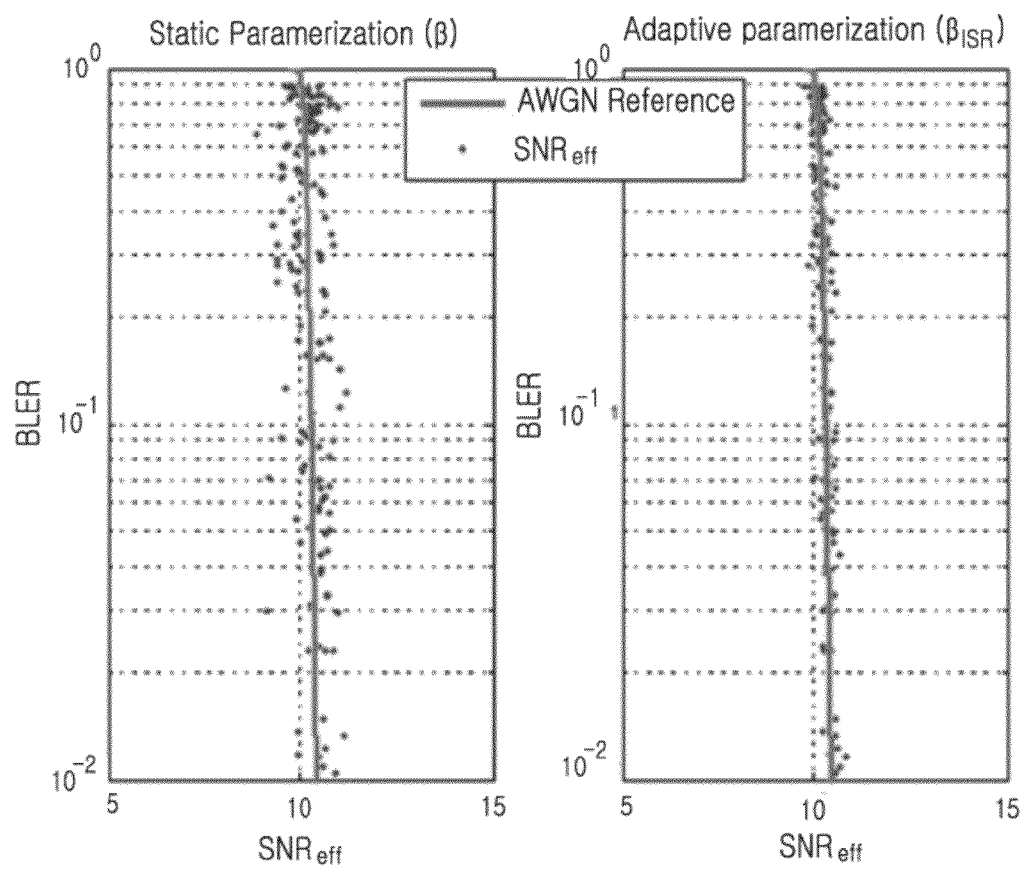

Referring to FIGS. 10 and 11, a comparison between the prediction accuracy of the method according to various embodiments of the present disclosure and the conventional approach is provided for the IAC with $V_1$=1 and $V_2$=1, denoted by 2×2 IAC, where the BSs use a combination of $MCS_1$=9 and $M_c^2$=4QAM and $MCS_1$=17 and $M_c^2$=16QAM, respectively. The AWGN reference curve plots the mapping function $LUT_{AWGN}$(SNR,MCS) corresponding to the involved $MCS_1$, whereas each dot marks coordinates of ($SINR_{eff}$,$BLER_{monte}$) for a different channel state of $\{h_k^1, h_k^2\}_{k=1}^K \in S_{channel}^{new}$ and $\sigma_n^2 \in S_{snr}^{new}$. Thus, the accuracy of the abstraction can be measured by the difference between $SINR_{eff}$ and $SINR_{awgn}=LUT_{AWGN}^{-1}(BLER_{monte},MCS_1)$ In other words, the closer the dots approach the AWGN reference curve in the horizontal distance (corresponding to the distance between the two points ($SINR_{eff}$,$BLER_{monte}$) and ($SINR_{awgn}$,$BLER_{monte}$)), the more accurate prediction is achieved by the link abstraction method. As seen from FIG. 10 and FIG. 11, significant improvements of the prediction accuracy can be obtained by the present ISR-adaptive approach.

Now, the performance gain of the IAC receiver is analyzed from the system-level simulation results. As a reference, a standard Interference Rejection Combining (IRC) receiver defined in 3GPP "Technical Specification Group Radio Access Network; Enhanced performance requirement for LTE User Equipment (UE)," TR 36.829 v11.1.0, December 2012.

TABLE 3

| Parameter | Assumption |
| --- | --- |
| Cellular Layout | Hexagonal Grid |
| | 19 cell sites, 3 sectors per site |
| Carrier frequency | 2.0 GHz |
| System bandwidth | 10 MHz |
| FFT size | 1024 |
| Subcarrier separation | 15 KHz |
| Resource Allocation | 50RB |
| Number of UEs | 10 UEs per sector |
| Transmission mode | TM4 (Closed-loop MIMO) |
| Total BS TX power | 46 dBm |
| Channel Model | ITU M.2135 Channel Model [19] |
| Distance-dependent path loss | ITU Urban Macro |
| Shadowing correlation | 0.5 between cells |
| | 1.0 between sectors |

TABLE 3-continued

| Parameter | Assumption |
|---|---|
| Antenna pattern (Horizontal) | $A_m$ = 25 dB, $\phi_{3\,dB}$ = 70 degrees |
| Antenna pattern (Vertical) | SLA = 20 dB, $\theta_{3\,dB}$ = 10 degrees |
| Antenna Height | 25 m |
| UE antenna Height | 1.5 m |
| MIMO configuration | 2Tx(0.5 lambda), Cross-polarized |
| | 2Rx(0.5 lambda), Cross-polarized |
| Receiver Type | IRC Receiver(LTE baseline [20]) |
| | IAC Receiver |
| UE noise figure | 9 dB |
| Thermal noise density | −174 dBm/Hz |
| UE speeds of interest | 30 km/h |
| PCFICH | CFI = 3 |
| Traffic model | Full buffer traffic |
| Feedback | Feedback Periodicity: 5 msec |
| | Feedback Delay: 6 msec |
| Scheduler | Proportional Fairness (PF) |

Table 3 describes the set of simulation assumptions used for the LTE system-level simulations. Various embodiments of the present disclosure assume that all the cells are fully loaded and consider a Proportional Fairness (PF) algorithm for resource allocation. 10 UEs are randomly distributed in each sector.

Figure 12:
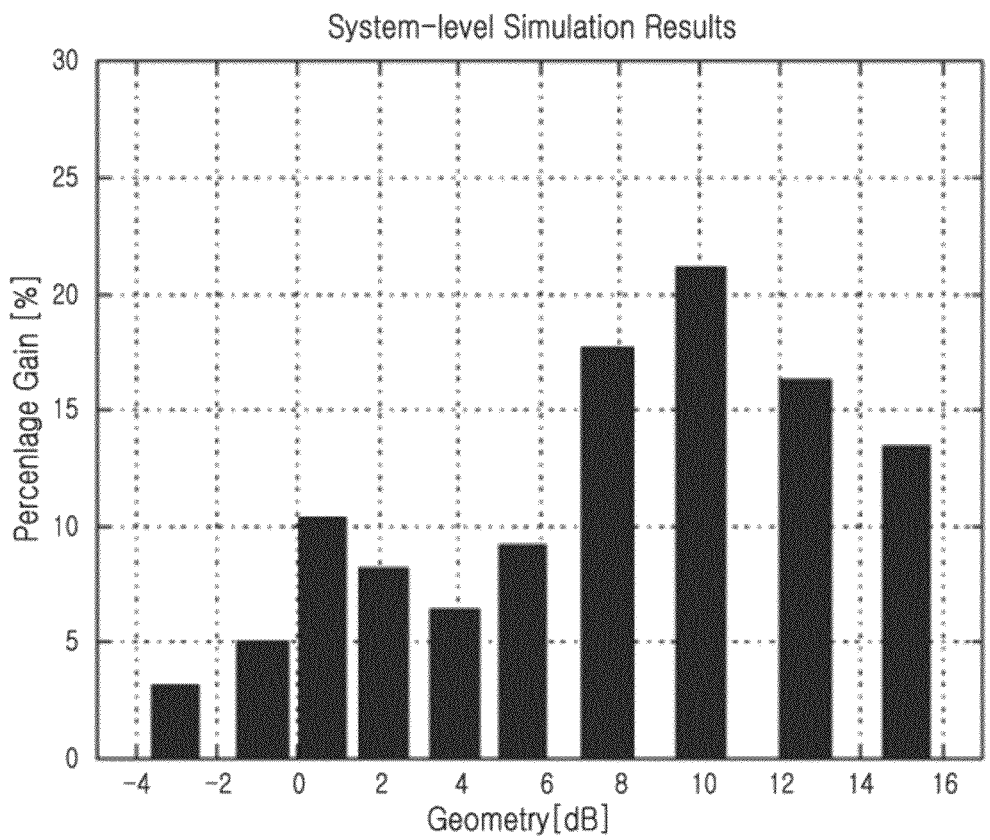
FIG. 12 illustrates performance improvement of an Interference-Aware Communications (IAC) receiver according to an embodiment of the present disclosure.

FIG. 12 illustrates performance improvement of an IAC receiver according to an embodiment of the present disclosure.

Referring to FIG. 12, performance improvements by the advanced IAC receiver over the LTE baseline receiver with respect to geometry according to an embodiment of the present disclosure are illustrated. Herein, the so-called geometry is defined as the ratio of the received signal power from the serving BS to the power of the signals received from all the other BSs. For the geometry of 0 dB corresponding to a position of the UE close to the cell edge, a throughput gain of 5% to 10% is observed. The throughput gain comes from joint detection of the serving and interfering signals thanks to the IAC receiver. With the geometry of 10 dB and above corresponding to a more typical position of the UE, the throughput gain increases up to 21%. This improvement can be explained by the fact that the IAC receiver scheme allows more UEs to be served with more aggressive MCSs and more transmission layers.

5. CONCLUSION

Various embodiments of the present disclosure provide a method and an apparatus for link performance abstraction of a IAC system employing a maximum-likelihood detector in a multicell interfering network. Various embodiments of the present disclosure are inspired by the observation that the conventional approach based on the static parameterization can lead to the wrong link abstraction in the storing interference case. Various embodiments of the present disclosure provide the adaptive link abstraction model relaying on the ISR. The present ISR-adaptive strategy according to various embodiments of the present disclosure outperforms the conventional static approach in terms of the BLER prediction accuracy by overcoming the drawback of the conventional strategy in the high ISR region. Such outperformance proves that the present link abstraction model according to various embodiments of the present disclosure can improve the CQI prediction of future IAC systems. The system-level simulation results show that the advanced IAC receiver achieves the significant throughput improvement over the baseline IRC receiver in the interference-limited LTE environment.

For example, the various embodiments of the present disclosure is applied to, but not limited to, the MIMO-OFDM system of FIG. 1.

While the receiving components of the UE of FIG. 5 realize the present disclosure, the single processor 210 may realize the operations of the present disclosure. In this case, program instructions for carrying out various operations executed by a computer can be recorded in a non-transitory computer-readable medium. The non-transitory computer-readable medium can include, alone or in combination, the program instructions, data files, data structures, and the like. The program instructions may be designed and constructed especially for the implementations of the present disclosure, or well known to those skilled in the art. Examples of non-transitory computer-readable storage medium include magnetic media, such as hard disks, floppy disks, and magnetic tape, optical media such as Compact Disc (CD) Read Only Memory (ROM) disks and Digital Versatile Discs (DVDs), magneto-optical media, such as floptical disks, and hardware devices specially configured to store and execute the program instructions, such as ROM, Random Access Memory (RAM), flash memory, and the like. Examples of program instructions include machine code produced by a compiler, and high-level language code executed by the computer using an interpreter. When all or part of the BS or the relay is implemented as a computer program, the present disclosure can include the non-transitory computer-readable recording medium storing the computer program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a receiving apparatus for link performance abstraction in a wireless communication system, the method comprising:
    receiving, by a receiver, an Orthogonal Frequency Division Multiplexing (OFDM) over a plurality of spatial layers;
    splitting and post-processing, by a controller, the received signal based on the spatial layers;
    deriving, by the controller, a post-processing Signal-to-Interference-plus-Noise Ratio (SINR) of each spatial layer;
    converting, by the controller, the post-processing SINR of the spatial layers to a Mutual Information per coded Bit (MIB) adaptively tuned based on an instantaneous Interference-to-Signal Ratio (ISR); and
    estimating, by the controller, a Block Error Rate (BLER) from a mean of the MIB metrics of the spatial layers.

2. The method of claim 1, wherein the deriving of the post-processing SINR comprises:
    deriving the post-processing SINR using Maximum-Likelihood Detection (MLD).

3. The method of claim 1, wherein the post-processing SINR ranges from an upper bound and a lower bound of the post-processing SINR.

4. The method of claim 3, wherein the upper bound of the post-processing SINR comprises an SINR for an interference-free receiver, and
    wherein the lower bound of the post-processing SINR comprises an SINR for a most-interfered receiver.

5. The method of claim 3, wherein the converting of the post-processing SINR of the spatial layers to the MIB metric comprises:

calculating an MIB upper bound corresponding to the upper bound of the post-processing SINR and an MIB lower bound corresponding to the lower bound of the post-processing SINR; and calculating the MIB metric with a function of a combining parameter determined based on the MIB upper bound, the MIB lower bound, and the instantaneous ISR.

6. The method of claim 5, wherein the combining parameter $\beta_{ISR}$ is determined based on the instantaneous ISR, a Modulation and Coding Scheme (MCS) of a serving Base Station (BS), and a modulation order of an interfering BS.

7. The method of claim 6, wherein the combining parameter increases to 1 as the ISR grows.

8. The method of claim 1, wherein the estimating of the BLER comprises:
calculating the mean of the MIB metrics of the spatial layers;
calculating an effective SINR from the mean of the MIB metrics; and
estimating the BLER from the effective SINR.

9. The method of claim 1, wherein the estimating of the BLER comprises:
calculating the mean of the MIB metrics of the spatial layers; and
estimating the BLER from the mean of the MIB metrics.

10. The method of claim 1, wherein the estimating of the BLER comprises:
calculating the mean of the MIB metrics of the spatial layers;
calculating an effective SINR; and
estimating the BLER from the effective SINR.

11. A receiving apparatus for link performance abstraction in a wireless communication system, the receiving apparatus comprising:
a receiver configured to receive an Orthogonal Frequency Division Multiplexing (OFDM) over a plurality of spatial layers;
a Signal-to-Interference-plus-Noise Ratio (SINR) extractor configured to split and post-process the received signal based on the spatial layers, and to derive a post-processing SINR of each spatial layer;
a Mutual Information per coded Bit (MIB) calculator configured to convert the post-processing SINR of the spatial layers to a MIB adaptively tuned based on an instantaneous Interference-to-Signal Ratio (ISR); and
a Block Error Rate (BLER) estimator configured to estimate a BLER from a mean of the MIB metrics of the spatial layers.

12. The receiving apparatus of claim 11, wherein the SINR extractor derives the post-processing SINR using Maximum-Likelihood Detection (MLD).

13. The receiving apparatus of claim 11, wherein the post-processing SINR ranges from an upper bound and a lower bound of the post-processing SINR.

14. The receiving apparatus of claim 13, wherein the upper bound of the post-processing SINR comprises an SINR for an interference-free receiver.

15. The receiving apparatus of claim 13, wherein the lower bound of the post-processing SINR comprises an SINR for a most-interfered receiver.

16. The receiving apparatus of claim 13, wherein the MIB metric calculator calculates an MIB upper bound corresponding to the upper bound of the post-processing SINR and an MIB lower bound corresponding to the lower bound of the post-processing SINR, and calculates the MIB metric with a function of a combining parameter determined based on the MIB upper bound, the MIB lower bound, and the instantaneous ISR.

17. The receiving apparatus of claim 16, wherein the combining parameter is determined based on the instantaneous ISR, a Modulation and Coding Scheme (MCS) of a serving Base Station (BS), and a modulation order of an interfering BS.

18. The receiving apparatus of claim 17, wherein the combining parameter increases to 1 as the ISR grows.

19. The receiving apparatus of claim 11, wherein the BLER estimator calculates the mean of the MIB metrics of the spatial layers, calculates an effective SINR from the mean of the MIB metrics, and estimates the BLER from the effective SINR.

20. The receiving apparatus of claim 11, wherein the BLER estimator calculates the mean of the MIB metrics of the spatial layers, and estimates the BLER from the mean of the MIB metrics.

21. A non-transitory computer-readable storage medium storing instructions that, when executed, cause at least one processor to perform the method of claim 1.

22. The method of claim 1, further comprising:
generating feedback information using the estimated BLER; and
communicating the feedback information to a base station.

23. The receiving apparatus of claim 11, further comprising:
a controller configured to generate feedback information using the estimated BLER, and to communicate the feedback information to a base station.

* * * * *